(12) United States Patent
Miyajima et al.

(10) Patent No.: US 7,668,341 B2
(45) Date of Patent: Feb. 23, 2010

(54) IMAGE RECOGNITION APPARATUS AND IMAGE RECOGNITION METHOD

(75) Inventors: Takayuki Miyajima, Okazaki (JP);
Masaki Nakamura, Okazaki (JP);
Motohiro Nakamura, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 451 days.

(21) Appl. No.: 11/338,712

(22) Filed: Jan. 25, 2006

(65) Prior Publication Data
US 2006/0228000 A1    Oct. 12, 2006

(30) Foreign Application Priority Data
Jan. 28, 2005    (JP)    ............... 2005-021337

(51) Int. Cl.
*G06K 9/00*    (2006.01)
*G06K 9/46*    (2006.01)
(52) U.S. Cl. .................. 382/104; 382/190; 382/270
(58) Field of Classification Search ................ 382/104, 382/270, 190; 348/113, 118
See application file for complete search history.

(56) References Cited

U.S. PATENT DOCUMENTS

| | | | | |
|---|---|---|---|---|
| 5,351,044 A | * | 9/1994 | Mathur et al. ............... | 340/901 |
| 5,638,116 A | * | 6/1997 | Shimoura et al. ........... | 348/118 |
| 2002/0134151 A1 | | 9/2002 | Naruoka et al. .............. | 73/291 |
| 2003/0072471 A1 | * | 4/2003 | Otsuka et al. ............... | 382/103 |
| 2004/0022416 A1 | | 2/2004 | Lemelson et al. .......... | 382/104 |

FOREIGN PATENT DOCUMENTS

| | | |
|---|---|---|
| JP | 11-213155 | 8/1999 |
| JP | 2003-121167 | 4/2003 |
| JP | 2005-018573 | 1/2005 |

* cited by examiner

*Primary Examiner*—Jon Chang
(74) *Attorney, Agent, or Firm*—Bacon & Thomas, PLLC (57) ABSTRACT

An image recognition apparatus is capable of recognizing an image of an object of interest with high recognition accuracy even when the object is difficult to recognize only from image information acquired by an image pickup apparatus. The image recognition apparatus includes image information acquisition means for capturing image information of an image taken on a road, road feature information acquisition means for acquiring, from map information, road feature information C associated with a feature in the neighborhood of a position where the image information is taken, and image information recognition means for recognizing the image information using the road feature information C to recognize an image of an object to be recognized corresponding to the feature included in the image information.

24 Claims, 7 Drawing Sheets

IMAGE RECOGNITION APPARATUS AND IMAGE RECOGNITION METHOD

INCORPORATION BY REFERENCE

The disclosure of Japanese Patent Application No. 2005-021337 filed on Jan. 28, 2005, including the specification, drawings and abstract thereof, is incorporated herein by reference in its entirety.

BACKGROUND OF THE INVENTION

1. Field of the Invention

The present invention relates to an image recognition apparatus installed in a vehicle or the like, for recognizing an image of a particular recognition target included in image information taken on a road, and to a method of recognizing such an image.

2. Description of the Related Art

Japanese Unexamined Patent Application Publication No. 11-213155 (pages 2 to 3, FIG. 1) discloses a technique to recognize a particular recognition target, based on image information of an image taken on a road. That is, Japanese Unexamined Patent Application Publication No. 11-213155 discloses an apparatus adapted to recognize a boundary line (a lane mark) on the surface of a road, based on image information taken on the road. The apparatus is installed in a vehicle that runs on a road, and the apparatus includes image pickup means for taking an image of a road ahead of the vehicle, and recognition means for recognizing a boundary line on the surface of the road, based on the image information taken by the image pickup means. The recognition means recognizes the boundary line by using a string model whose shape is modified depending on an image feature value of the boundary line included in the image taken by the image pickup means. As for the image feature value of the boundary line, brightness or chromaticity of each pixel is used.

In this apparatus, binarization of image information and expansion from a point to line are not performed to prevent instability in recognition caused by a variation in an external environment, which can occur when the binarization or the expansion is performed, thereby achieving high recognition accuracy for the boundary line.

In the conventional techniques described above, the recognition accuracy for a recognition target such as a boundary line is increased by improving a recognition algorithm based on image information taken by a camera or the like. However, in such a conventional technique, because only image information is used in the recognition process, if a correct image feature value cannot be acquired from image information, a significant reduction in the recognition accuracy occurs.

For example, when image information includes an image of an object having a feature value that is so similar to that of a recognition target to be recognized that it is difficult to distinguish the recognition target from the similar object, or when, depending on the shooting condition in terms of weather or brightness or depending on the recognition target, the condition of objects in the vicinity of the recognition target, the type of the recognition target, there is no significant difference in terms of the luminance or color between the recognition target to be recognized and other objects in the vicinity of the recognition target, it is difficult to correctly recognize the recognition target.

SUMMARY OF THE INVENTION

In view of the above, the present invention provides an image recognition apparatus and an image recognition method, capable of recognizing an image of an object to be recognized with high recognition accuracy even for an image that is difficult to correctly recognize using only image information.

More specifically, the present invention provides an image recognition apparatus comprising image information acquisition means for capturing image information of an image taken on a road, road feature information acquisition means for acquiring, from map information, road feature information associated with a feature in the neighborhood of a position where the image is taken, and image information recognition means for recognizing the image information using the road feature information to recognize an image of a recognition target corresponding to the feature included in the image information.

In this image recognition apparatus, the image recognition is performed using not only image information taken by the image information acquisition means but also road feature information associated with a feature in the neighborhood of the capturing position of the image information acquired from the map information, and thus it is possible to recognize the recognition target corresponding to the feature with high recognition accuracy even when it is difficult to correctly recognize the target using only the image information.

In the image recognition apparatus, the image information recognition means may extract one or more candidates for the image of the recognition target from the image information, compare the extracted candidates with the road feature information, and employ a candidate having high similarity with the road feature information as the image of the recognition target thereby recognizing the image of the recognition target.

In this image recognition technique, because a candidate image with high similarity with the road feature information acquired from the map information is employed as the image of the recognition target, the probability of incorrect recognition can be greatly reduced even when the image information includes an image of an object having a feature that is so similar to that of the recognition target to be recognized that it is difficult to distinguish the recognition target from the similar object, and thus it is possible to increase the accuracy of recognizing the recognition target.

In the image recognition apparatus, the image information recognition means may detect, based on the road feature information, an area likely to include the image of the recognition target from the image information, and adjust, based on the detection result, a recognition algorithm such that a criterion to determine whether an image of interest is of the recognition target becomes lower for the area likely to include the image of the recognition target than for the other area.

In this image recognition apparatus, because the image recognition is performed by adjusting, based on the road feature information acquired from the map information, the recognition algorithm such that the criterion to determine whether an image is of the recognition target becomes lower for the area likely to include the image of the recognition target than for the other area, it is possible to recognize the recognition target with high recognition accuracy even when, depending on the shooting condition in terms of weather or brightness or depending on the recognition target, the condition of objects in the vicinity of the recognition target, the type of the recognition target, there is no significant difference in terms of the luminance or color between the recognition target to be recognized and other objects in the vicinity of the recognition target.

In the image recognition apparatus, the road feature information may include position information associated with the feature and may further include at least one of shape information and color information associated with the feature. This makes it possible to acquire the road feature information in a form that can be easily distinguished from the image information.

The feature may include one or both of a painted mark on the surface of a road, such as a boundary line or an allowed driving direction mark, and a running-prohibited area adjacent to the road, such as a road shoulder or a sidewalk.

The present invention also provides an image recognition apparatus comprising image information acquisition means for capturing image information of an image taken on a road, road feature information acquisition means for acquiring, from map information, road feature information associated with a first feature and a second feature in the neighborhood of the capturing position of the image information, first target recognition means for recognizing an image of the first recognition target corresponding to the first feature that can be relatively easily recognized and that is included in the image information, road feature information comparison means for comparing the image of the first recognition target recognized by the first target recognition means with the road feature information associated with the first feature acquired by the road feature information acquisition means to detect the correspondence between the image information and the road feature information, likely area detection means for, based on the result of the comparison made by the road feature information comparison means, detecting from the image information an area likely to include an image of a second recognition target corresponding to the second feature that is more difficult to recognize than the first recognition target, and second target recognition means for recognizing an image of the second recognition target included in the image information, by adjusting a recognition algorithm based on the result of the detection made by the likely area detection means such that a criterion to determine whether an image is of the second recognition target becomes lower for the area likely to include the image of the second recognition target than for the other area.

In this image recognition apparatus, as described above, the recognition result of the image of the first recognition target corresponding to the first feature that is relatively easy to recognize is compared with the road feature information associated with the first feature to detect the correspondence between the image information and the road feature information, and, based on the comparison result, an area likely to include the image of the second recognition target is detected. Thus, it is possible to detect an area highly likely to include the image of the second recognition target. Furthermore, based on the detection result, the recognition algorithm is adjusted such that the criterion to determine whether an image of interest is of the recognition target becomes lower for the area likely to include the image of the recognition target than for the other area. Thus, it is possible to increase the recognition accuracy for the second recognition target that would otherwise be difficult to recognize compared to the first recognition target.

In this image recognition apparatus, the first target recognition means may extract one or more candidates for the image of the first recognition target from the image information, and the road feature information comparison means may compare the one or more candidates for the image of the first recognition target with the road feature information associated with the first feature acquired by the road feature information acquisition means, employ a candidate having high similarity as the image of the first recognition target thereby recognizing the image of the first recognition target, and detect correspondence between the image information and the road feature information by using the recognized image of the first recognition target as a reference.

Because a candidate having high similarity with the road feature information acquired from the map information is recognized as the image of the first recognition target, it is possible to recognize the image of the first recognition target with high recognition accuracy even when the image information of the shot image includes an image of an object having a feature value that is so similar to that of the first a recognition target to be recognized that it is difficult to distinguish the first recognition target from the similar object. Furthermore, use of the resultant recognized image of the first recognition target in the detection of the correspondence between the image information and the map information makes it possible to achieve high accuracy in the detection of the correspondence between the image information and the map information.

The road feature information may include position information associated with the first and second features and may further include at least one of the shape information and the color information associated with the first and second features. This makes it possible to acquire the road feature information in a form that can be easily distinguished from the image information, and thus it is possible to reduce the load in terms of the recognition process for the first and second recognition targets.

The first feature, which is relative easy to recognize, is a painted mark on the surface of a road, such as a boundary line or an allowed driving direction mark, and the second feature is a running-prohibited area adjacent to the road, such as a road shoulder or a sidewalk.

The road feature information acquisition means may acquire, from map information described in a map information database provided in a navigation apparatus, the road feature information in the neighborhood of a position acquired, when image information is captured by the image pickup apparatus, by position information acquisition means provided in the navigation apparatus.

Thus, it is possible to easily acquire the road feature information by using the navigation apparatus with a common construction. That is, the image recognition apparatus needs neither a special database in terms of the road feature information nor a unit for detecting the position where the image information is taken. This allows the image recognition apparatus to be realized at low cost.

The image information acquisition means may capture image information taken by the image pickup apparatus installed in a vehicle at predetermined time intervals.

Installation of the image recognition apparatus according to the present invention in a vehicle makes it possible to perform real-time recognition of an image of road on which the vehicle is running.

The present invention also provides a vehicle control apparatus comprising image information acquisition means for capturing image information of an image taken on a road, road feature information acquisition means for acquiring, from map information, road feature information associated with a feature in the neighborhood of a position where the image is taken, image information recognition means for recognizing the image information using the road feature information to recognize an image of a recognition target corresponding to the feature included in the image information, and running control means for controlling the running of the vehicle based on a result of recognition performed by the image information recognition means.

Because the vehicle control apparatus is capable of recognizing the status or the condition of an environment where the vehicle M is running based on the recognition of the image information, it is possible to control the running of the vehicle in terms of the steering and/or the acceleration/deceleration so that the vehicle runs along a correct lane and so that the vehicle M is prevented from encountering a traffic accident.

The present invention also provides a navigation apparatus comprising a map information database in which map information is described, position information acquisition means for acquiring vehicle position information, image information acquisition means for capturing image information of an image taken on a road, road feature information acquisition means for acquiring, from the map information, road feature information associated with a feature in the neighborhood of the vehicle position acquired by the position information acquisition means, image information recognition means for recognizing the image information using the road feature information to recognize an image of a recognition target corresponding to the feature included in the image information, and vehicle position correction means for correcting the vehicle position information, based on a result of recognition performed by the image information recognition means.

Thus, the navigation apparatus is capable of recognizing the detailed vehicle position based on the recognition of the image information, and capable of displaying the vehicle position in a more detailed manner in which, for example, information indicating a lane the vehicle is running is provided. It is also possible to provide route guidance at a most opportune time based on the information indicating the detailed vehicle position.

The present invention also provides an image recognition method comprising the steps of capturing image information of an image taken on a road, acquiring, from map information, road feature information associated with a feature in the neighborhood of a position where the image is taken, and recognizing the image information using the road feature information to recognize an image of a recognition target corresponding to a feature included in the image information.

In this image recognition method, as described above, the image recognition is performed using not only image information but also road feature information associated with a feature in the neighborhood of the capturing position of the image information acquired from the map information, and thus it is possible to recognize the recognition target corresponding to the feature with high recognition accuracy even when it is difficult to correctly recognize the target using only the image information.

The present invention also provides an image recognition method comprising the steps of capturing image information of an image taken on a road, acquiring, from map information, road feature information associated with a first feature and a second feature in the neighborhood of the capturing position of the image information, recognizing an image of the first recognition target corresponding to the first feature that can be relatively easily recognized and that is included in the image information, comparing the image of the first recognition target recognized in the first target recognition step with the road feature information associated with the first feature acquired in the road feature information acquisition step to detect the correspondence between the image information and the road feature information, based on the result of the comparison made in the road feature information comparison step, detecting from the image information an area likely to include an image of a second recognition target corresponding to the second feature that is more difficult to recognize than the first recognition target, and recognizing an image of the second recognition target included in the image information, by adjusting a recognition algorithm based on the result of the detection made in the likely area detection step such that a criterion to determine whether an image is of the second recognition target becomes lower for the area likely to include the image of the second recognition target than for the other area.

In this image recognition method, as described above, the recognition result of the image of the first recognition target corresponding to the first feature that is relatively easy to recognize is compared with the road feature information associated with the first feature to detect the correspondence between the image information and the road feature information, and, based on the comparison result, an area likely to include the image of the second recognition target is detected. Thus, it is possible to detect an area highly likely to include the image of the second recognition target. Furthermore, based on the detection result, the recognition algorithm is adjusted such that the criterion to determine whether an image of interest is of the recognition target becomes lower for the area likely to include the image of the recognition target than for the other area. Thus, it is possible to increase the recognition accuracy for the second recognition target that would otherwise be difficult to recognize compared to the first recognition target.

DESCRIPTION OF THE PREFERRED EMBODIMENTS

The present invention is described in further detail below with reference to embodiments in conjunction with the accompanying drawings.

Figure 1:
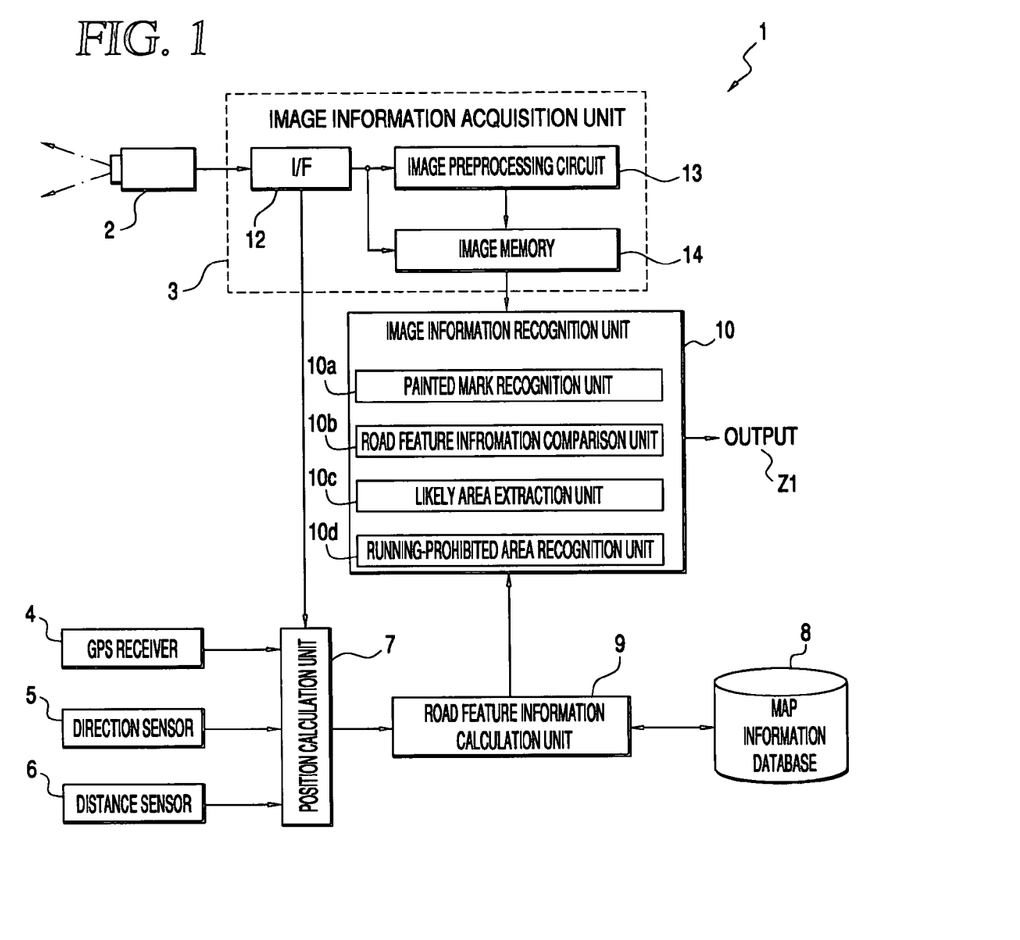
FIG. 1 is a schematic block diagram illustrating a hardware configuration of an image recognition apparatus according to an embodiment of the invention.

In embodiments described below, by way of example, an image recognition apparatus 1 is assumed to be installed in a vehicle M. FIG. 1 is a schematic block diagram illustrating a hardware configuration of the image recognition apparatus 1 according to the present embodiment.

Figure 2:
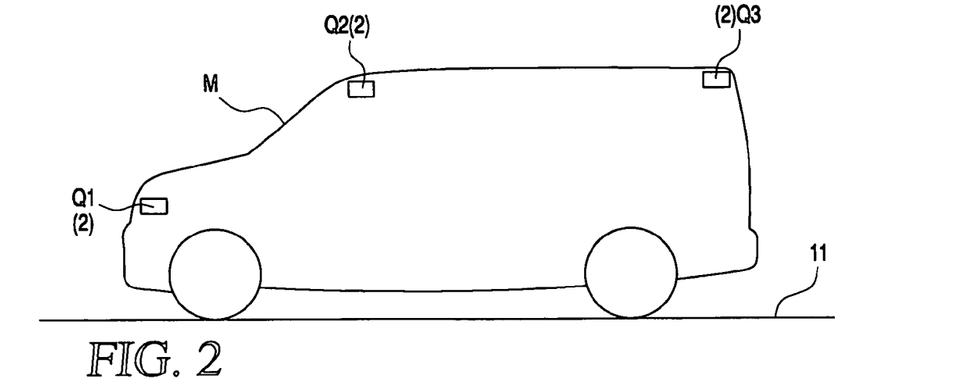
FIG. 2 is a diagram illustrating examples of locations at which an image recognition apparatus is disposed according to an embodiment of the invention.

As shown in FIG. 1, the image recognition apparatus 1 according to the present embodiment mainly includes an image information acquisition unit 3 adapted to capture image information G from an image pickup apparatus 2 installed in a vehicle M (FIG. 2), a GPS (Global Positioning System) receiver 4, a position calculation unit 7 adapted to determine the position of an image captured by the image pickup apparatus 2 based on an output from a direction sensor 5 and an output from a distance sensor 6, a road feature information calculation unit 9 adapted to perform a calculation to acquire, from map information stored in a map information database 8, road feature information C associated with a feature in the neighborhood of the position of the image captured by the image pickup apparatus 2, and an image information recognition unit 10 adapted to recognize image information G by using the acquired road feature information C and recognize an image of a recognition target corresponding to the feature included in the image information.

The position calculation unit 7, the GPS receiver 4, the direction sensor 5, the distance sensor 6, and the map information database 8, are usually included in an in-vehicle navigation apparatus designed to provide route guidance information. The "position information acquisition means" according to the present embodiment of the invention is realized by the position calculation unit 7, the GPS receiver 4, the direction sensor 5, and the distance sensor 6.

The image pickup apparatus 2 includes, for example, an image sensor such as a CCD sensor or a CMOS sensor, and a lens serving as an optical system for guiding light to the image sensor. For example, the image pickup apparatus 2 is disposed, in a position aimed in a forward or backward direction, at a location denoted by Q1 to Q3 in FIG. 2 in the vehicle M such that the image pickup apparatus 2 can take an image of the road surface of a road 11 on which the vehicle M runs and can take an image of nearby objects. A conventional in-vehicle camera designed to take an image of a scene viewed forward or backward from the vehicle M may be used as the image pickup apparatus 2.

The image information acquisition unit 3 includes an interface circuit 12 for interfacing with the image pickup apparatus 2, an image preprocessing circuit 13 adapted to perform preprocessing on the image information G supplied from the image pickup apparatus 2, and an image memory 14 for storing the preprocessed image information G. The interface circuit 12 includes an analog-to-digital converter that captures analog image information G taken by the image pickup apparatus 2 at predetermined time intervals, converts it into a digital signal, and outputs the resultant digital signal to the image preprocessing circuit 13. The time interval at which the interface circuit 12 captures the image information G is set, for example, within the range of 10 to 50 msec so that the image information acquisition unit 3 can substantially continuously acquire the image information of the road 11 along which the vehicle M runs. The image preprocessing circuit 13 performs preprocessing, such as binarization and edge detection, on the image information G to make it easy for the image information recognition unit 10 to perform image recognition. The resultant preprocessed image information G is stored in the image memory 14.

In addition to the image information G supplied to the image preprocessing circuit 13, the interface circuit 12 also supplies the image information G directly to the image memory 14. Thus, both the image information G2 subjected to the preprocessing performed by the image preprocessing circuit 13 and the original image information G1 that is not subjected to the preprocessing are stored in the image memory 14.

In the present embodiment, the image information acquisition unit 3 serves as the "image information acquisition means" according to the invention.

In the present embodiment, the position calculation unit 7 is connected to the GPS receiver 4, the direction sensor 5 and the distance sensor 6. The GPS receiver 4 is a device that receives a signal from a GPS satellite to acquire information in terms of, for example, the position (the latitude and the longitude) and the moving speed of the GPS receiver 4. The direction sensor 5 includes a geomagnetic sensor or a gyroscopic sensor, an optical rotation sensor or a rotation-type potentiometer disposed on a rotating part of a steering wheel, or an angle sensor disposed on a wheel, for detecting the direction in which the vehicle M runs. The distance sensor 6 for detecting the moving distance of the vehicle M includes a vehicle speed sensor for detecting the number of revolutions of a wheel, or a combination of a yaw/acceleration sensor for detecting the acceleration of the vehicle M and a circuit adapted to integrate the detected acceleration twice. The position calculation unit 7 calculates the current position of the vehicle M based on the signals output from the GPS receiver 4, the direction sensor 5, and the distance sensor 6. The calculated position of the vehicle M is also employed as the position of the image pickup apparatus 2.

The position calculation unit 7 is also connected to the interface circuit 12 of the image information acquisition unit 3. The interface circuit 12 outputs a signal to the position calculation unit 7 when an image taking operation is performed by the image pickup apparatus 2. This allows the position calculation unit 7 to determine the position at which the image information G was captured, by determining the position of the image pickup apparatus 2 as of when the signal was received from the interface circuit 12. The capturing position of the image information G determined by the position calculation unit 7 is expressed in latitude and longitude and is output to the road feature information calculation unit 9.

The position calculation unit 7 includes a processing unit such as a CPU serving as a core device and also includes functional parts implemented by hardware or software or by a combination of hardware and software for performing various processes on input data.

The road feature information calculation unit 9 is connected to the position calculation unit 7 and the map information database 8.

Figure 3:
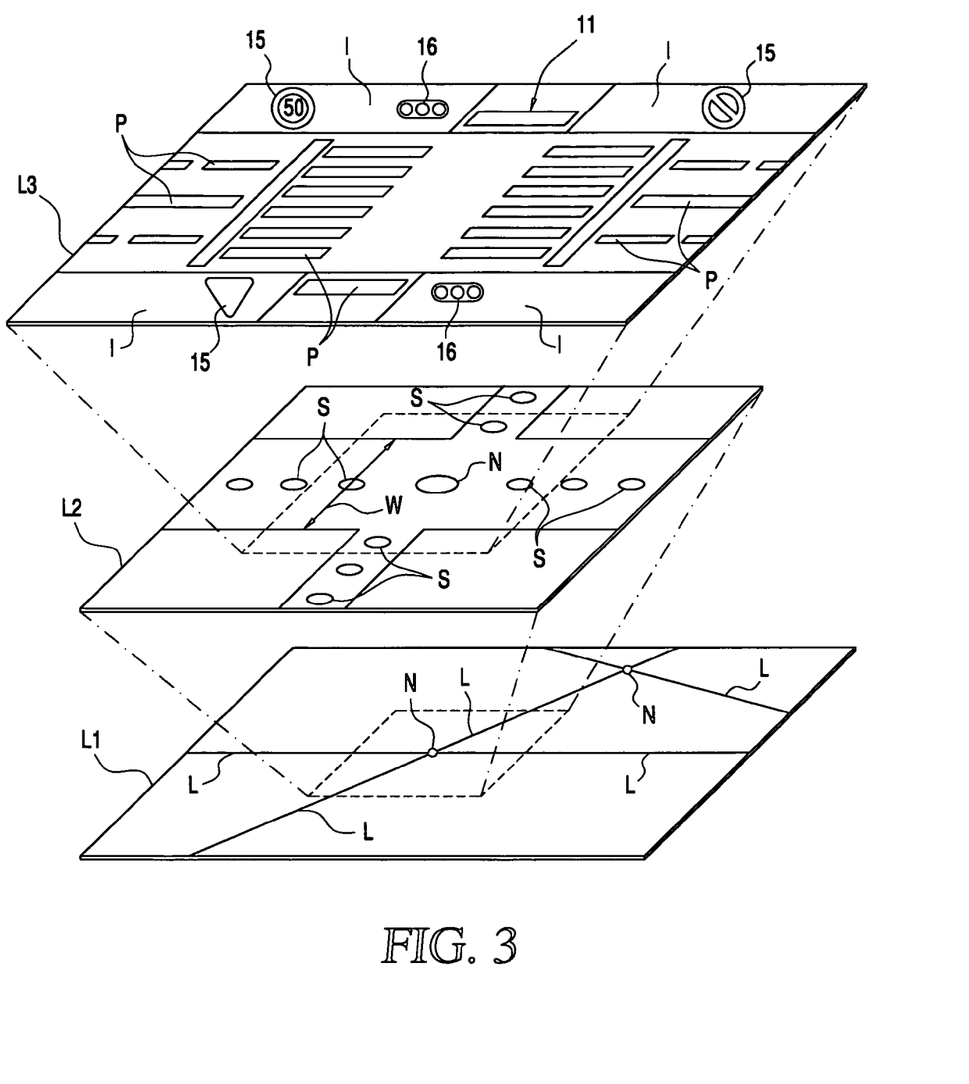
FIG. 3 is a schematic diagram illustrating contents of map information stored in a map information database of an image recognition apparatus according to an embodiment of the invention.

FIG. 3 is a schematic diagram illustrating contents of map information stored in the map information database 8. As shown in FIG. 3, in the map information database 8 according to the present embodiment, a road network layer L1, a road shape layer L2, and a feature layer L3 are stored as map information.

In the road network layer L1, information indicating connections among roads 11 is represented. More specifically, information associated with a large number of nodes N with position information on the map represented in latitude and longitude and information associated with a large number of links L corresponding to roads 11 that connect two adjacent nodes N are represented in the road network layer L1. The information associated with each link L includes information indicating the type of each road 11 (expressway, toll road, national road, or prefectural road) and the length of the link.

The road shape layer L2 represents shapes of roads 11 and is stored in connection with the road network layer L1. More specifically, road shape layer L2 includes information indicating positions expressed in latitude and longitude on the map for a large number of supplementary road shape points S located between two adjacent nodes N (on links L) and also includes information indicating the road width W at each supplementary road shape point S.

The feature layer L3 includes information associated with features located on or in the neighborhood of the road 11 and is stored in connection with the road network layer L1 and the road shape layer L2. The feature information described in the feature layer L3 includes at least information in terms of the position, the shape, the color, etc. of features that can be objects to be recognized by the image recognition apparatus 1. More specifically, in the present embodiment, the feature information includes information in terms of the position on the map with respect to the supplementary road shape point S or the node N, the shape, the color, etc. for various features such as painted marks P on the surface of the road 11, running-prohibited areas I adjacent to the road 11, and various kinds of traffic signs 15 and traffic signals 16 on the road 11. The painted marks P include, for example, boundary lines (and information indicating the types of boundary lines, such as a solid line, a broken line, a double line) between adjacent traffic lanes, zebra zone marks, an allowed driving direction mark indicating the allowed driving direction for each lane, stop lines, pedestrian crossing marks, and speed limit signs. The painted marks P also include manholes formed on surfaces of the road 11, although manholes are not painted marks in a strict sense. The running-prohibited area I includes, for example, road shoulders adjacent to the road, and sidewalks.

The map information database 8 is realized on a hardware device including a storage medium adapted to store information and a device adapted to drive the storage medium, such as a hard disk drive, a DVD drive with a DVD-ROM, or a CD drive with a CD-ROM Based on information indicating the capturing position in latitude and longitude of the image information G determined by the position calculation unit 7, the road feature information calculation unit 9 performs a calculation to acquire road feature information C associated with features in the neighborhood of the capturing position of the image information G from the map information C stored in the map information database 8. More specifically, the road feature information calculation unit 9 extracts feature information as road feature information C in terms of the position, the shape, the color, etc. of features included in an area in the neighboring of the capturing position of the image information G, including at least the area whose image is taken by the image pickup apparatus 2, from the feature layer L3 of the map information database 8.

The road feature information calculation unit 9 includes a processing unit such as a CPU serving as a core device and also includes functional parts implemented by hardware or software or by a combination of hardware and software for performing various processes on input data.

In the present embodiment, the road feature information calculation unit 9 serves as the "road feature information acquisition means" according to the invention.

The image information recognition unit 10 is connected to the image memory 14 of the image information acquisition unit 3 and also to the road feature information calculation unit 9. The image information recognition unit 10 recognizes the image information G using the road feature information C acquired by the road feature information calculation unit 9 to recognize images of objects to be recognized included in the image information G.

The objects to be recognized by the image information recognition unit 10 corresponds to features described as feature information in the feature layer L3, such as the painted marks P, the running-prohibited areas I, various traffic signs 15, and traffic signals 16.

The image information recognition unit 10 includes a processing unit such as a CPU serving as a core device and also includes functional parts implemented by hardware or software or by a combination of hardware and software for performing various processes on input data.

In the present embodiment, the image information recognition unit 10 serves as the image information recognition means according to the present invention.

In the image recognition apparatus 1, the recognition process of the image information G performed by the image information recognition unit 10 using the road feature information C may be accomplished by one of or a combination of the following two methods.

A first image recognition method includes extracting candidates for an image of a recognition target to be recognized from the image information G, comparing the extracted candidate image with the road feature information C, and selecting a candidate image with high similarity with the road feature information C as the image of the recognition target, thereby recognizing the image of the object.

A second image recognition method includes extracting, based on the road feature information C, an area likely to include an image of a recognition target to be recognized, from the image information G, adjusting, based on the extraction result, the recognition algorithm such that the judgment criterion for the area likely to include the image of the recognition target becomes lower than the judgment criterion for the other areas, and extracting a correct image of the recognition target from the image information G, thereby recognizing the image of the recognition target.

In the present embodiment, as will be described later with reference to a flow chart, the image information recognition unit 10 recognizes painted marks P on the surface of the road 11 and running-prohibited areas I adjacent to the road 11, by using a combination of the first and second image recognition methods. For the above purpose, the image information recognition unit 10 includes a painted mark recognition unit 10a, a road feature information comparison unit 10b, a likely area extraction unit 10c, and a running-prohibited area recognition unit 10d.

Now, with reference to a flow chart shown in FIG. 4, a detailed explanation is given below as to the image recognition process to recognize painted mark P on the surface of the road 11 and running-prohibited areas I adjacent to the road 11 using the combination of the first and second image recognition methods.

In this example of the image recognition process, painted marks P can be easily recognized because of their great difference in brightness or color from the surface of the road 11, and the painted marks P correspond to "first objects to be recognized" according to the present invention. On the other hand, running-prohibited areas I such as a road shoulder, a sidewalk, or a traffic strip do not have a great difference in brightness or color from the road 11 or other neighboring features, and thus it is generally difficult to detect edges thereof, even if edge enhancement or the like is performed.

Thus it is more difficult to recognize running-prohibited areas I than to recognize painted marks P, and running-prohibited areas I correspond to "second objects to be recognized" according to the present invention.

Figure 4:
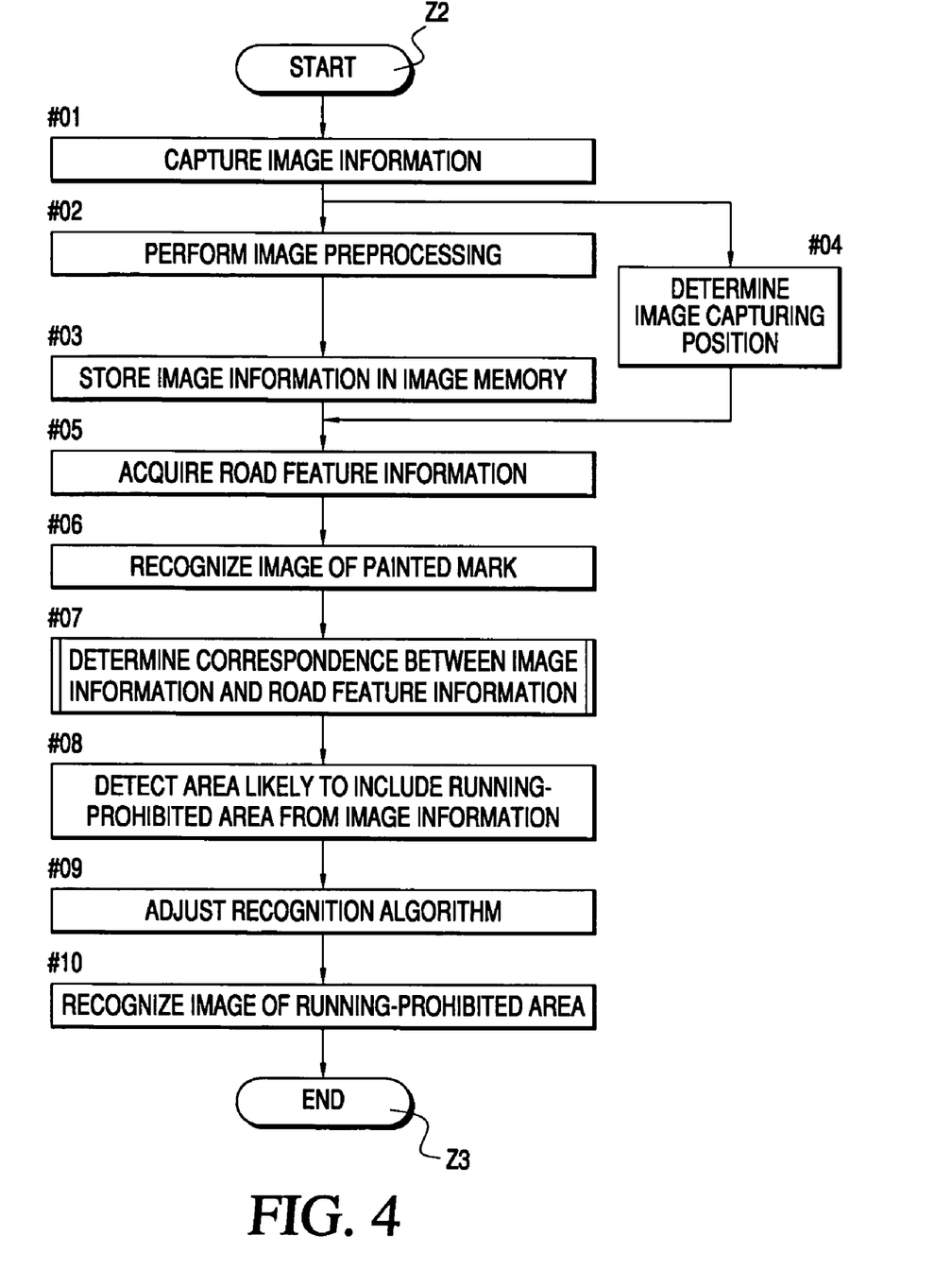
FIG. 4 is a flowchart indicating a specific example of an image recognition process performed by an image recognition apparatus according to an embodiment of the present invention.

As shown in FIG. 4, first, the image recognition apparatus 1 captures image information G taken by the image pickup apparatus 2 (step #01). More specifically, the image recognition apparatus 1 transmits the image information G taken the image pickup apparatus 2 such as an in-vehicle camera to the image preprocessing circuit 13 and the image memory 14 via the interface circuit 12. At a time at which the image information G is supplied from the image pickup apparatus 2, which is substantially the same as the time at which an image is taken by the image pickup apparatus 2, the interface circuit 12 outputs a timing signal to the position calculation unit 7 to inform the position calculation unit 7 of the timing of taking the image.

Figure 5A:
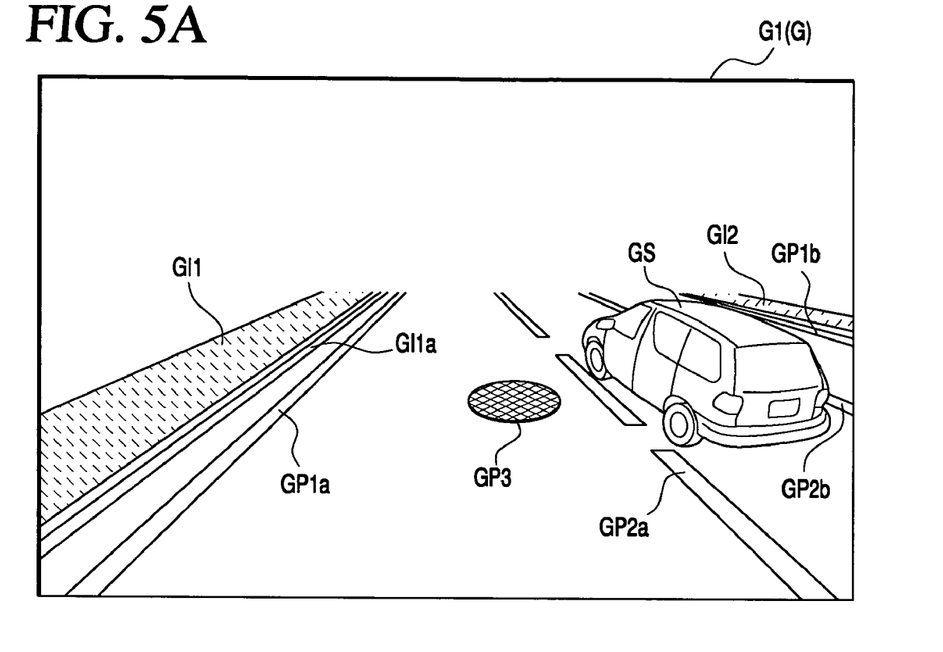
FIG. 5A shows an example of image information captured by an image pickup apparatus.
Figure 5B:
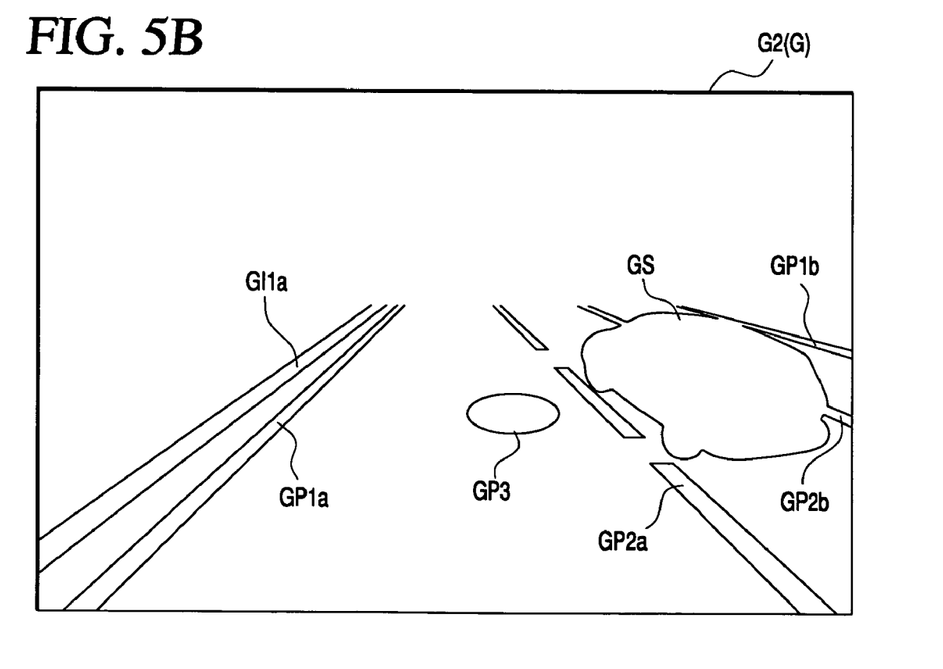
FIG. 5B shows an example of image information obtained by performing preprocessing on the image information shown in FIG. 5A.

Upon receiving the image information G, the image preprocessing circuit 13 performs the preprocessing on the received image information G (step #02). The preprocessing performed here is, for example, binarization or edge detection to make it easy for the image information recognition unit 10 to perform image recognition. FIG. 5A shows an example of image information G (G1) taken by the image pickup apparatus 2, and FIG. 5B shows an example of image information G (G2) obtained by preprocessing the image information G shown in FIG. 5A. In this example shown in FIG. 5B, an image indicating an outline of a thing imaged as image information G by an edge search process is extracted. The image information G2 obtained via the preprocessing in step #02 and the image information G1 directly received from the interface circuit 12 are stored in the image memory 14 (step #03).

In parallel with the process in steps #02 and #03, the position calculation unit 7 determines the capturing position of the image information G (step #04). More specifically, when the signal indicating the timing of outputting the image information G is received from the interface circuit 12, the position calculation unit 7 regards the received signal as indicating the time at which the image was taken by the image pickup apparatus 2, and the position calculation unit 7 determines the current position of the vehicle M, based on information supplied from the GPS receiver 4, the direction sensor 5, and the distance sensor 6. The current position of the vehicle M determined in this way is employed as the capturing position of the image information G. The determined capturing position is expressed in latitude and longitude, and supplied to the road feature information calculation unit 9.

The road feature information calculation unit 9 acquires road feature information C associated with features in the neighborhood of the capturing position of the image information G, from the map information stored in the map information database 8. (step #05). In this process, the road feature information calculation unit 9 extracts, from wide-area map information stored in the map information database 8, road feature information C associated with features located within a particular range R from the capturing position determined in step #04. It is desirable that the range R from the capturing position be set such that the area whose image is taken as the image information G by the image pickup apparatus 2 is included within the range R.

Figure 6:
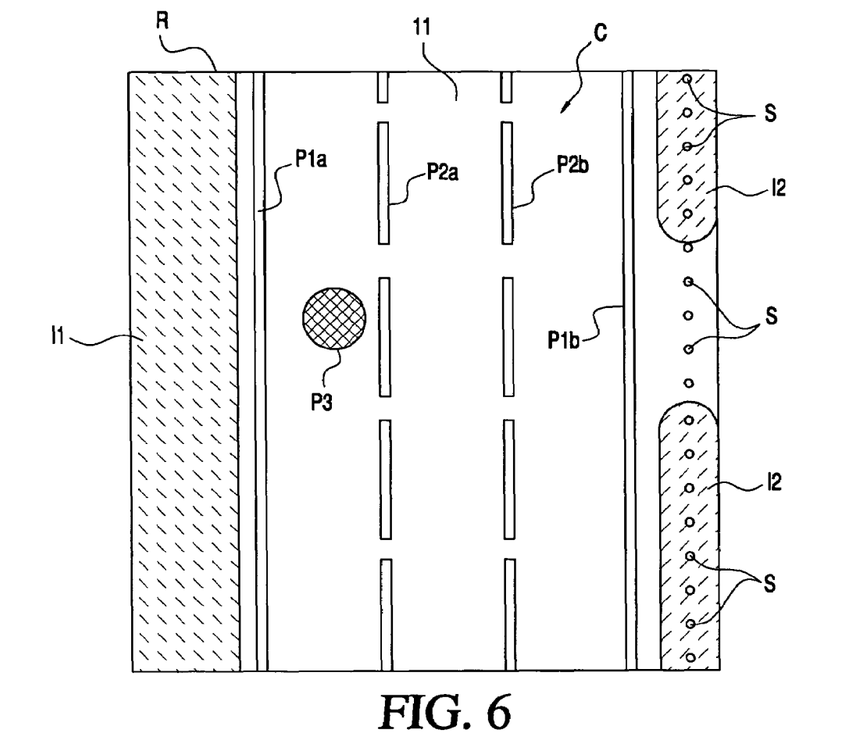
FIG. 6 is a diagram showing an example of road feature information acquired by a road feature information calculation unit of an image recognition apparatus according to an embodiment of the present invention.

FIG. 6 illustrates, in the form of a drawing, an example of road feature information C acquired by the road feature information calculation unit 9. In the present example, features included in the road feature information C are painted marks P including two boundary lines P1a and P1b in the form of solid lines indicating outer side edges of a road 11 having three traffic lanes for each driving direction, two dashed boundary lines P2a and P2b between adjacent lanes of the three traffic lanes, and a manhole P3 in the leftmost lane of the three traffic lanes. Running-prohibited areas I include a sidewalk 11 adjacent on the left to the road 11 and a central traffic strip 12 adjacent on the right to the road 11. Note that the road feature information C shown in FIG. 6 is by way of example only, and the road feature information C may include various features depending on the capturing position of the image information G.

The road feature information C includes position information, shape information, and color information associated with respective features. The position information of each feature indicates the position with respect to a supplementary road shape point S (or a node N such as an intersection (FIG. 3)). More specifically, the position information is given only by the distance (offset) from a supplementary road shape point S (or a node N) for features located along the road 11, such as boundary lines P1a and P1b in the form of solid lines, boundary lines P2a and P2b in the form of broken lines, and running-prohibited areas I such as a sidewalk 11 and a central traffic strip 12. On the other hand, for features which are not along the road 11, such as a manhole P3, a stop line, and a traffic sign, the position information is represented by the distance and the direction with respect to a specific supplementary road shape point S (or a node N).

The shape information of each feature includes information representing the size (the width, the depth, and the height) with respect to the position indicated by the position information and also information representing the shape (contour). It is desirable that the shape information be represented in a simplified form that allows it to easily make a comparison with the image information G.

For a feature having a plurality of colors, such as a road traffic sign, it is desirable to represent color information for each area corresponding to each color in the shape information.

After the above-described process, the painted mark recognition unit 10a of the image information recognition unit 10 recognizes images of painted marks P included in the image information G (step #06). That is, in the present embodiment, candidates for images of painted marks P are extracted from the image information G2 obtained as a result of the preprocessing in step #02. More specifically, as shown in FIG. 5B, images having high similarity with feature data such as templates representing features of painted marks P such as boundary lines and manholes are extracted from the image information G2 obtained via the preprocessing such as the edge enhancement, and extracted images are employed as candidates for images of the painted marks P. In the example shown in FIG. 5B, an image GS of a vehicle running ahead and an image GP2b of a boundary line in the form of a broken line on the right-hand side, partially hidden by the vehicle, are discarded, and the other images, that is, an image GP2a of a boundary line in the form of a broken line on the left-hand side, an image GP1a of a boundary line in the form of a solid line on the left-hand side, an image G11a of a curb of a sidewalk on the outer side thereof, an image GP1b of a boundary line in the form of a solid line on the right-hand side, and an image GP 3 of a manhole are employed as candidates for the images of painted marks P.

In the present example, as described above, the painted marks P corresponds to "first recognition targets" according to the present invention, and the painted mark recognition unit 10a that recognizes images of painted marks P servers as the "first target recognition means" according to the present invention.

Thereafter, the road feature information comparison unit 10b of the image information recognition unit 10 compares the recognition result of the image of the painted mark P in step #06 with the road feature information C in terms of the painted mark P acquired in step #05 to detect the correspondence between the image information G and the road feature information C (step #07). More specifically, in the present embodiment, candidates for the image of the painted mark P are compared with the road feature information C associated with the painted mark P, and a candidate having high similarity with the road feature information C is employed as the image of the painted mark P thereby recognizing the image of the painted mark P. Thereafter, the correspondence between the image information G and the road feature information C is detected by using the recognized image of the painted mark P as a reference.

Thus, in the present embodiment, the road feature information comparison unit 10b serve as the "road feature information comparison means" according to the present invention.

Figure 7:
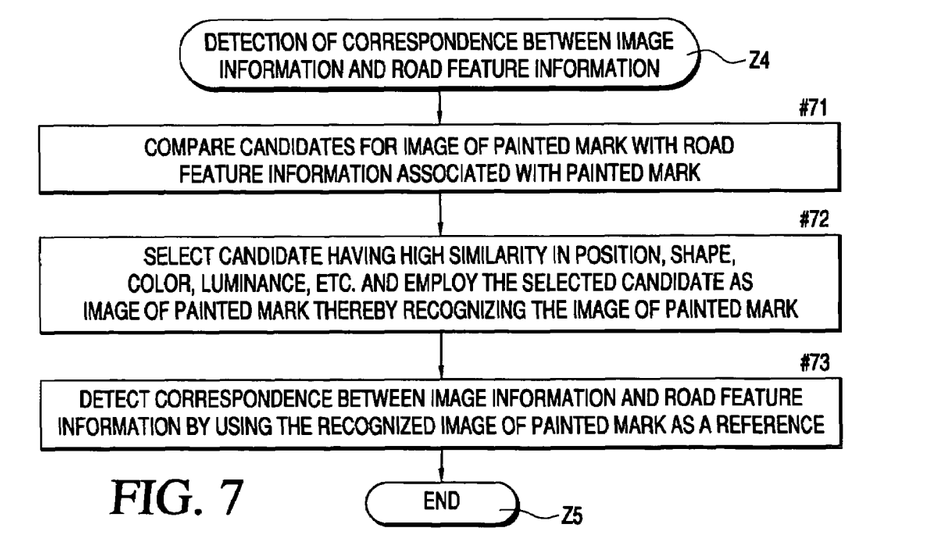
FIG. 7 is a flowchart associated with a process (step #07) performed by an image recognition apparatus to determine correspondence between image information and road feature information, according to an embodiment of the present invention.

FIG. 7 is a flowchart showing a process in step #07 according to the present embodiment. In this process in step #07, as shown in FIG. 7, candidates for the image of the painted mark P extracted in step #06 are compared with information that is acquired in step #05 from the road feature information C and that is associated with the painted mark P (step #71), to extract a candidate having high similarity with the information in terms of the position, the shape, the color, and/or the brightness. (step #72). In the example shown in FIG. 6, based on the road feature information C associated with the painted marks P, it is possible to detect the positional relationships (spaces) among the boundary lines P1a, P1b, P2a, and P2b in the form of solid or broken lines, the positional relationships of the manhole P3 relative to the respective boundary lines P1a, P1b, P2a, and P2b, and the shape, the color, and the luminance of the boundary lines P1a, P1b, P2a, and P2b and the manhole P3. As described above, by extracting images having high similarity with the road feature information C from the images included in the image information G, it is possible to extract only candidates that are highly likely to be images of the painted marks P. In the example shown in FIG. 5, the image GI1a of the curb of the sidewalk to the left of the solid boundary line GP1a on the left-hand side is discarded in the process of step #72. The candidates for the images extracted in this way are regarded as the images of the painted marks P. Note that the information in terms of the color, the luminance, and the like of the candidate images of the painted marks P can be acquired from the original image information G that is not subject to the preprocessing and that is stored in the image memory 14.

Figure 8A:
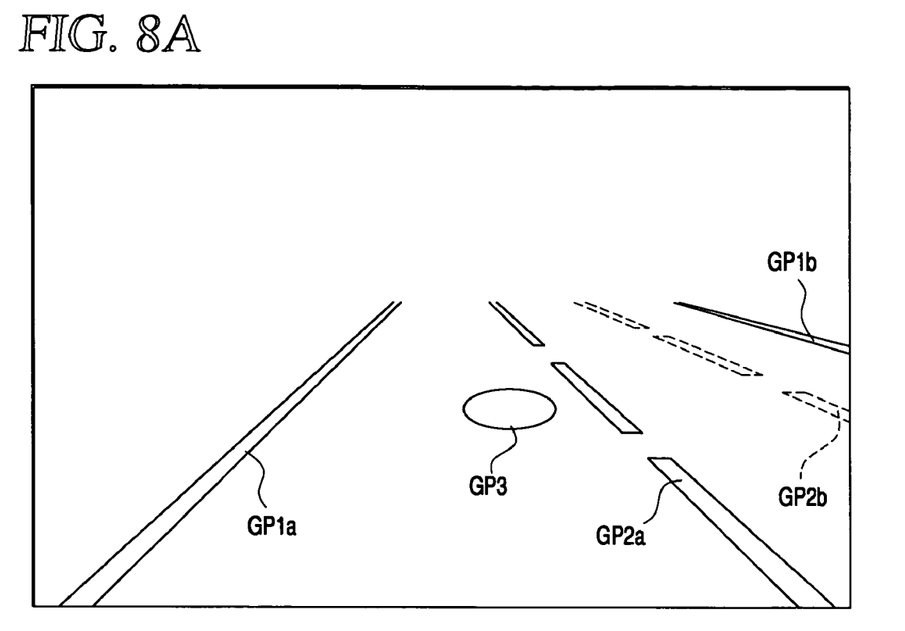
FIG. 8A is a diagram showing only images of painted marks extracted, in step #72, from image information.

FIG. 8A is a diagram showing only images of the painted marks P extracted from the image information G in the process of step #72. Note that the image GP2b of the broken boundary line on the right-hand side has been discarded together with the image GS of the vehicle from the candidate images of the painted marks P, and thus they are not included in the extracted images of the painted marks P (they are represented by dotted lines in FIG. 8A).

Thereafter, the correspondence between the image information G and the road feature information C is detected by using the recognized image of the painted mark P as a reference (step #73). More specifically, the correspondence between the respective features included in the road feature information C and the images included in the image information G is determined based on the correspondence between the positions of the images of the painted marks P recognized in the image information G and the positions of the painted marks P included in the road feature information C. In this determination process, by employing a feature extending along the road 11, such as the boundary lines GP1a or GP2a, as a reference, it is possible to precisely determine the positional correspondence in the direction across the width of the road 11. On the other hand, by employing a feature, such as the manhole P3, which does not extend along the road 11, a stop line (not shown), or a similar traffic sign, as a reference, it is possible to precisely determine the positional correspondence in the direction along the road 11.

Thereafter, as shown in FIG. 4, the likely area extraction unit 10c of the image information recognition unit 10 detects an area likely to include an image of a running-prohibited area I from the image information G, based on the correspondence, determined in step #07, between the road feature information C and the image information G (step #08). That is, based on the correspondence determined in step #07 between the road feature information C and the image information G, it is possible to detect very likely locations of images of respective features including the painted marks P and the running-prohibited areas I in the image information G. Thus, the area in the image information G with the position and the color corresponding to the position and the color of the running-prohibited area I in the road feature information C is detected based on the correspondence determined in step #07. The resultant area detected in step #08 is regarded as the area of the image of the running-prohibited area l.

Figure 8B:
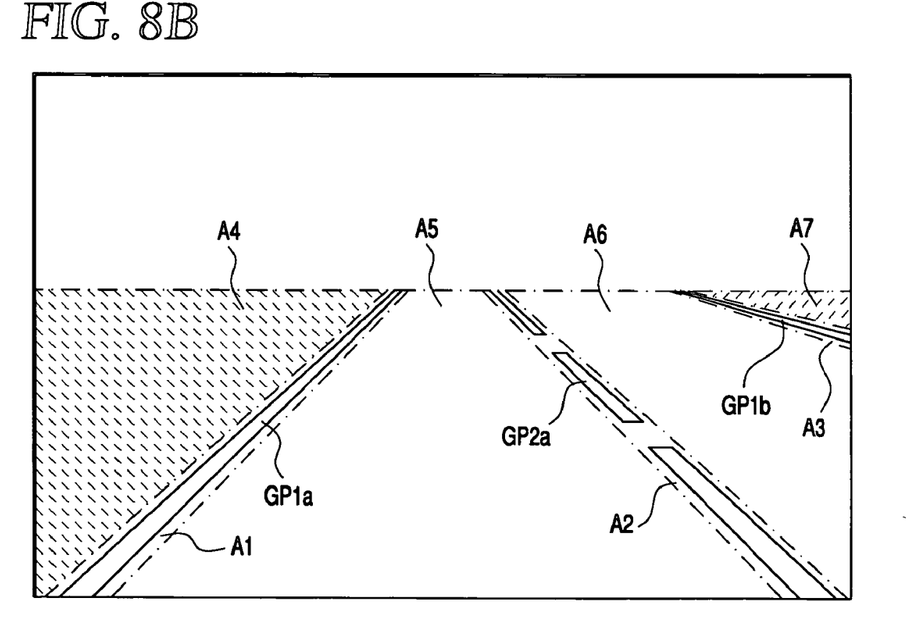
FIG. 8B is a diagram showing a state in which the total image shown in FIG. 8A is divided into areas based on boundary lines.

In the present embodiment, as shown in FIG. 8B, based on the boundary lines P1a, P1b and P2a included in the painted marks P extracted in step #72, the total image area of the image information G acquired via the shooting is roughly divided into areas A1 to A3 respectively including the boundary lines P1a, P1b and P2a and areas A4 to A7 respectively located between two adjacent areas of A1 to A3. Thereafter, based on the correspondence determined in step #07, a judgment is made as to whether each of the areas A4 to A7 includes the running-prohibited area l, thereby detecting an area very likely to include the image of the running-prohibited area l. In this specific example, as shown in FIG. 6, it is determined based on the road feature information C that running-prohibited areas I exist at locations to the left of and to the right of the respective two solid boundary lines P1a and P1b at both side edges of the road 11, and thus it is determined that the images of the running-prohibited areas I exist respectively in the areas A4 and A7 respectively outwardly adjacent to the areas A1 and A3 respectively including the solid boundary lines P1a and P1b located at side edges of the road 11.

Thereafter, the recognition algorithm of the recognition process performed by the running-prohibited area recognition unit 10d of the image information recognition unit 10 is adjusted based on the detection result in step #08 (step #09), and the images of the running-prohibited areas I included in the image information G are recognized (step #10).

In this specific example, the recognition algorithm is adjusted such that the criterion to determine whether an area includes a running-prohibited area I becomes lower for the areas A4 and A7 determined in step #08 to very likely include the running-prohibited area I than for the other areas (the areas A5 and A6 in this specific case). As described earlier, running-prohibited areas I such as a sidewalk I1, a traffic strip I2, and a road shoulder are similar in luminance or color to the road 11 or other neighboring objects, and thus it is generally difficult to detect an edge thereof even if edge enhancement is performed. Therefore, in general, it is more difficult to recognize such a running-prohibited area I than painted marks P. The above difficulty can be solved by adjusting the recognition algorithm such that the criterion to determine whether an area includes a running-prohibited area I becomes lower for the areas A4 and A7 determined in step #08 to very likely include the running-prohibited area I than for the other areas, thereby achieving high recognition accuracy for the running-prohibited areas l.

Adjusting of the recognition algorithm such that the criterion to determine whether an area includes a running-prohibited area I becomes lower for a particular area can be accomplished in many ways. One method is, as described above, to lower the criterion for an area, such as A4 or A7 in the above-described example, detected as being very likely to include an image of a running-prohibited area 1. Another method is to increase the criterion for areas other than the areas A4 and A7. Still another method is to lower the criterion for the areas A4 and A7 and increase the criterion of the other areas. A proper method of adjusting the recognition algorithm may be selected depending on the method of recognizing the running-prohibited areas l.

Figure 9:
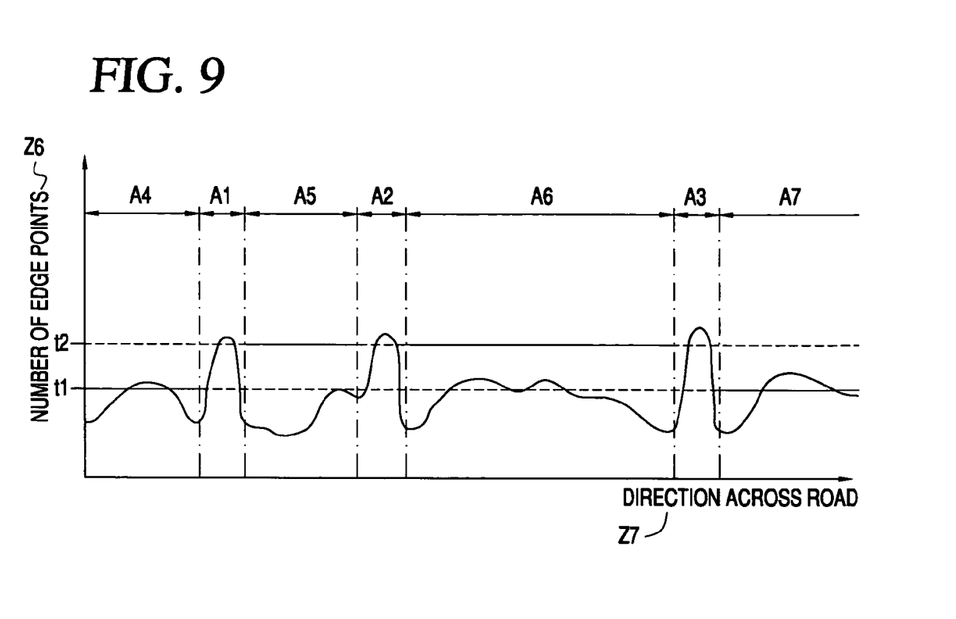
FIG. 9 is a graph showing the number of edge points detected across the width of a road from the image information shown in FIG. 5.

In the present embodiment, for example, the algorithm of recognizing the image of the running-prohibited area I involves detecting edges of images included in the image information G, detecting the number of edge points at respective locations across the width of the road 11, and determining that a running-prohibited area I exists in an area where a greater number of edge points than a predetermined threshold value are detected. In the above recognition algorithm, two different threshold values may be used. A first threshold value t1 is set to be low, and a second threshold value t2 is set to be high, as shown in FIG. 9. That is, the first threshold value t1 is used for areas, such as the areas A4 and A7 in this specific example, determined as areas highly likely to include an image of a running-prohibited area l, and the second threshold value t2 is used for the other areas, such as the areas A5 and A6, thereby adjusting the recognition algorithm such that the criterion to determine whether an area of interest is a running-prohibited area I becomes lower for areas, such as the areas A4 and A7 in the present example, determined as areas highly likely to include an image of a running-prohibited area I than for other areas, such as the areas A5 and A6.

FIG. 9 is a graph showing the number of edge points detected across the width of the road 11 from the image information G shown in FIG. 5. As shown in FIG. 9, the areas A1 to A3 have a large number of edge points, because these areas respectively include the boundary lines P1a, P1b, and P2b. However, these areas A1 to A3 are not included in areas to be examined to detect a running-prohibited area l. The area A5 of an asphalt road generally has a small number of edge points except for an area corresponding to the manhole P3.

On the other hand, the areas A4, A6, and A7 have a rather large number of edge points. Note that the edge points in the areas A4 and A7 correspond to edges of the running-prohibited areas I such as the sidewalk I1 or the central traffic strip I2, while the edge points in the area A6 correspond to edges of the image Gs of a vehicle running ahead or edges of the broken boundary line GP2b partially hidden behind the image Gs of the vehicle. As can be understood from FIG. 9, it is difficult to determine, only from the number of edges, whether each of these areas is a running-prohibited area l.

In accordance with the detection of the highly likely areas in step #08, the first threshold value t1 set to be low is applied as the criterion for the detection of running-prohibited areas I to the areas A4 and A7 determined to be highly likely to include an image of a running-prohibited area l, while the second threshold value t2 set to be high is applied as the criterion for the detection of running-prohibited areas I to the other areas such as areas A5 and A6. Thus, the adjustment of the threshold value in accordance with the detection of the highly likely areas in step #08 makes it possible to reduce the probability of missing a running-prohibited area I existing in an area such as areas A4 and A7 determined to be highly likely to include an image of the running-prohibited area l, while it is possible to reduce the probability of detecting a wrong area such as A5 or A6 as a running-prohibited area l. This results in an increase in the accuracy of recognizing a running-prohibited area l. The specific values of the first threshold value t1 and the second threshold value t2 may be properly determined experimentally or statistically. It is also preferable that the first threshold value t1 and the second threshold value t2 be set variably depending on information extracted from the image information G or depending on a signal output from a sensor installed in the vehicle M.

Figure 10:
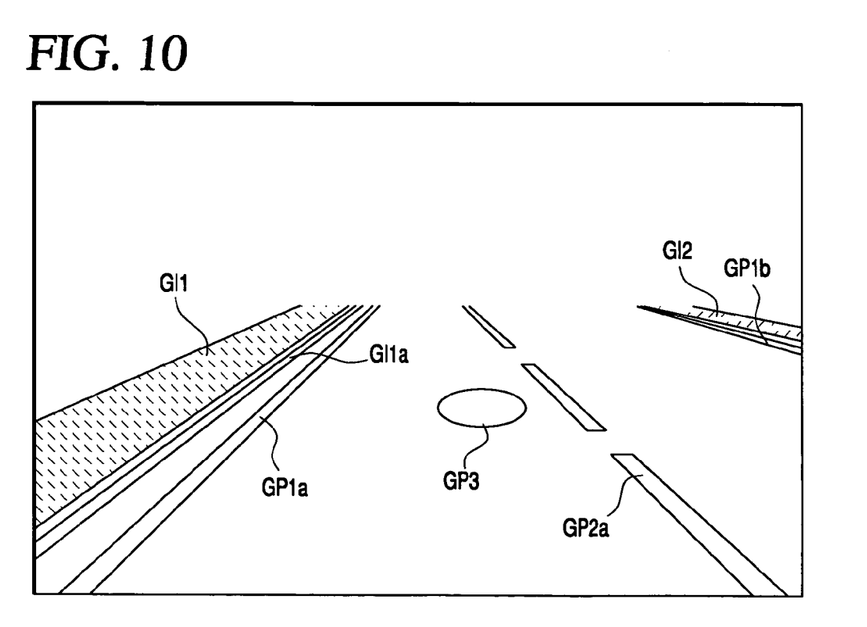
FIG. 10 is a diagram representing images recognized from image information G in steps #7 and #10 by an image recognition apparatus according to an embodiment of the present invention.

By employing the recognition method described above, it becomes possible to perform high-accuracy recognition of a running-prohibited area I such as a road shoulder, a sidewalk, or a traffic strip. In the present example, as shown in FIG. 10, in addition to the images of painted marks P extracted in step #72, an image GI1 of the sidewalk I1 located to the left of the image GP1a of the boundary line P1a and an image GI2 of the central traffic strip I2 located to the right of the image GP1b of the boundary line P1b are recognized.

The process from step #01 to #10 described above is performed repeatedly at predetermined time intervals to achieve real-time image recognition while the vehicle M is running.

The image recognition apparatus 1 described above may be applied to a vehicle control apparatus for controlling the running of the vehicle M or to a navigation apparatus for displaying the vehicle position. For example, use of the image recognition apparatus 1 in a vehicle control apparatus makes it possible to recognize a status or a condition of an environment where the vehicle M is running, based on an image recognized by the image information recognition unit 10 such as the distance and/or the direction of a running-prohibited area I such as a sidewalk or a traffic strip with respect to the vehicle M, or the distance and/or the direction of a stop line, a boundary line, a pedestrian crossing, or the like with respect to the vehicle M. This makes it possible to control the running of the vehicle in terms of the steering and/or the acceleration/deceleration so that the vehicle runs along a correct lane and so that the vehicle M is prevented from encountering a traffic accident.

On the other hand, use of the image recognition apparatus 1 in a navigation apparatus makes it possible to detect the vehicle position more precisely based on the result of image recognition performed by the image information recognition unit 10, than is possible by using only the conventional GPS receiver 4, the direction sensor 5, and the distance sensor 6. This makes it possible to display the vehicle position in a more detailed manner in which, for example, information indicating a lane the vehicle is running is provided, and it also becomes possible to provide route guidance at a most opportune time based on the information indicating the detailed vehicle position.

Although the present invention has been described above with reference to particular embodiments, the invention is not limited to the details of these embodiments. In the embodiment described above with reference to the flowchart shown in FIG. 4, painted marks P on the surface of the road 11 and running-prohibited areas I adjacent to the road 11 are recognized using a combination of the first image recognition method and the second image recognition method. Alternatively, only the first image recognition method may be used to extract candidates for images of painted marks P or running-prohibited areas I, compare the extracted candidates with road feature information C, and employ candidates having high similarity with the road feature information C as images of painted marks P or running-prohibited areas l.

Alternatively, only the second image recognition method may be used to recognize images of painted marks P and/or running-prohibited areas l. That is, based on the image capturing position determined by the position calculation unit 7 and based on the road feature information C, areas likely to include an image of a painted mark P or a running-prohibited area I are extracted from the image information G. Based on the extracted likely areas, the recognition algorithm is adjusted such that the criterion to determine whether an area of interest is a painted mark P or a running-prohibited area I becomes lower for the areas determined highly likely to include an image of a painted mark P or a running-prohibited area l, and an image of an area which should be recognized is correctly recognized from the image information G.

In the embodiments described above, by way of example, the image recognition apparatus 1 is installed in the vehicle M. However, the application of the image recognition apparatus 1 is not limited to installation in the vehicle M, but the image recognition apparatus 1 may be applied to a wide variety of apparatuses or systems in which the image pickup apparatus 2 moves on a road. The image recognition apparatus 1 may also used to recognize a still image taken on a road.

Note that it is not necessarily needed to dispose all parts of the image recognition apparatus 1 in a vehicle M. For example, one or more parts other than the image pickup apparatus 2 may be disposed in the outside of the vehicle M and the one or more parts may be connected to parts disposed in the vehicle M via a network such as the Internet so that information or a signal is transmitted between them via the network thereby realizing the image recognition apparatus 1. In this case, for example, the functions of the image information recognition unit 10 may be executed by an external server or the like.

The image recognition apparatus and the image recognition method according to the present invention can be advantageously used in various applications to recognize image information taken by an image pickup apparatus moving along a road as with an image pickup apparatus installed in a vehicle.

Having thus described preferred embodiments of the invention in sufficient detail to enable those skilled in the art to make and use the invention, it will nevertheless be appreciated that numerous variations and modifications of may be made without departing from the spirit of the invention. As a result, it is intended that the invention not be limited by the above description or accompanying drawings, but rather that the invention be defined solely in accordance with the appended claims.

What is claimed is:

1. An image recognition apparatus comprising:
   image information acquisition means for capturing image information of an image of an area taken on a road;
   road feature information acquisition means for acquiring, from map information stored in a map information database, road feature information associated with features in the neighborhood of the imaged area; and
   image information recognition means for using the road feature information to recognize, in the image information, images of recognition targets corresponding to the features associated with the acquired road feature information,
   wherein the image information recognition means detects in the image information, based on the road feature information, portions of the imaged area likely to include the image of a recognition target, and adjusts, based on the detection result, a recognition algorithm such that a criterion used to determine whether an image of interest is an image of the recognition target becomes lower for the portions of the imaged area likely to include the image of the recognition target than for the remainder of the imaged area.

2. The image recognition apparatus according to claim 1, wherein the image information recognition means extracts one or more candidates for the image of the recognition target from the image information, compares the extracted candidates with the road feature information, and employs a candidate having high similarity with the road feature information as the image of the recognition target, thereby recognizing the image of the recognition target.

3. The image recognition apparatus according to claim 1, wherein the road feature information includes position information associated with the features and also includes at least one of shape information and color information associated with the features.

4. The image recognition apparatus according to claim 1, wherein the features include one or both of a painted mark on the surface of a road and a running-prohibited area adjacent to the road.

5. The image recognition apparatus according to claim 1, wherein the road feature information acquisition means acquires from the map information stored in the map information database, the road feature information in the neighborhood of a position acquired, when image information is captured by the image pickup apparatus, by position information acquisition means provided in the navigation apparatus.

6. The image recognition apparatus according to claim 1, wherein the image information acquisition means captures image information taken by the image pickup apparatus installed in a vehicle at predetermined time intervals.

7. The image recognition apparatus according to claim 1:
   wherein the recognition algorithm, employed by the image information recognition means, detects edges of images included in the captured image information and detects the number of edge points at respective locations across the width of the road;
   wherein the portions of the imaged area likely to include the image of a recognition target are detected based on the detected number of edges therein; and
   wherein the criterion is a threshold value for the number of detected edges.

8. An image recognition apparatus comprising:
   image information acquisition means for capturing image information of an image of an area taken on a road;
   road feature information acquisition means for acquiring, from map information stored in a map information database, road feature information associated with a first feature and a second feature in the neighborhood of the capturing position of the image information;
   first target recognition means for recognizing an image of the first recognition target corresponding to the first feature that can be relatively easily recognized and that is included in the image information;
   road feature information comparison means for comparing the image of the first recognition target recognized by the first target recognition means with the road feature information associated with the first feature acquired by the road feature information acquisition means to detect the correspondence between the image information and the road feature information;
   likely area detection means for, based on the result of the comparison made by the road feature information comparison means, detecting from the image information a portion of the imaged area likely to include an image of a second recognition target corresponding to the second feature that is more difficult to recognize than the first recognition target; and second target recognition means for recognizing an image of the second recognition target included in the image information for the detected portion of the imaged area, by adjusting a recognition algorithm based on the result of the detection made by the likely area detection means such that a criterion used to determine whether an image is of the second recognition target becomes lower for the area likely to include the image of the second recognition target than for the remainder of the imaged area.

9. The image recognition apparatus according to claim 8, wherein the first target recognition means extracts one or more candidates for the image of the first recognition target from the image information; and the road feature information comparison means compares the one or more candidates for the image of the first recognition target with the road feature information associated with the first feature acquired by the road feature information acquisition means, employs a candidate having high similarity as the image of the first recognition target thereby recognizing the image of the first recognition target, and detects correspondence between the image information and the road feature information by using the recognized image of the first recognition target as a reference.

10. The image recognition apparatus according to claim 8, wherein the road feature information includes position information associated with the first and second features and also includes at least one of the shape information and the color information associated with the first and second features.

11. The image recognition apparatus according to claim 8, wherein the first feature is a painted mark on the surface of a road, and the second feature is a running-prohibited area adjacent to the road.

12. The image recognition apparatus according to claim 8, wherein the road feature information acquisition means acquires from the map information stored in the map information database provided in a navigation apparatus, the road feature information in the neighborhood of a position acquired, when image information is captured by the image pickup apparatus, by position information acquisition means provided in the navigation apparatus.

13. The image recognition apparatus according to claim 8, wherein the image information acquisition means captures image information taken by the image pickup apparatus installed in a vehicle at predetermined time intervals.

14. The image recognition apparatus according to claim 8:
wherein the recognition algorithm, employed by the second target recognition means, detects edges of images included in the captured image information and detects the number of edge points at respective locations across the width of the road;
wherein the portions of the imaged area likely to include an image of the second recognition target are detected based on the detected number of edges therein; and
wherein the criterion is a threshold value for the number of detected edges.

15. A vehicle control apparatus comprising:
image information acquisition means for capturing image information of an image of an area taken on a road;
road feature information acquisition means for acquiring, from map information stored in a map information database, road feature information associated with features in the neighborhood of the imaged area;
image information recognition means for using the road feature information to recognize, in the image information, images of recognition targets corresponding to the features associated with the acquired road feature information; and
running control means for controlling the running of the vehicle based on a result of recognition performed by the image information recognition means; and
wherein the image information recognition means detects, based on the road feature information, portions of the imaged area likely to include the image of a recognition target from the image information, and adjusts, based on the detection result, a recognition algorithm such that a criterion used to determine whether an image of interest is an image of the recognition target becomes lower for the portions of the imaged area likely to include the image of the recognition target than for the remainder of the imaged area.

16. The image recognition apparatus according to claim 15:
wherein the recognition algorithm, employed by the image information recognition means, detects edges of images included in the captured image information and detects the number of edge points at respective locations across the width of the road;
wherein the portions of the imaged area likely to include the image of a recognition target are detected based on the detected number of edges therein; and
wherein the criterion is a threshold value for the number of detected edges.

17. A navigation apparatus comprising:
a map information database in which map information is stored;
image information acquisition means for capturing image information of an image of an area taken on a road;
road feature information acquisition means for acquiring, from the map information, road feature information associated with features in the neighborhood of the imaged area;
image information recognition means for using the road feature information to recognize, in the image information, images of recognition targets corresponding to the features associated with the acquired road feature information; and
wherein the image information recognition means detects, based on the road feature information, portions of the imaged area likely to include the image of a recognition target from the image information, and adjusts, based on the detection result, a recognition algorithm such that a criterion used to determine whether an image of interest is an image of the recognition target becomes lower for the portions of the imaged area likely to include the image of the recognition target than for the remainder of the imaged area.

18. The navigation apparatus according to claim 17, further comprising position information acquisition means for acquiring vehicle position information and vehicle position correction means for correcting the vehicle position information based on a result of recognition performed by the image information recognition means.

19. The image recognition apparatus according to claim 17:
wherein the recognition algorithm, employed by the image information recognition means, detects edges of images included in the captured image information and detects the number of edge points at respective locations across the width of the road;

wherein the portions of the imaged area likely to include the image of a recognition target are detected based on the detected number of edges therein; and wherein the criterion is a threshold value for the number of detected edges.

20. An image recognition method, executed by a navigation apparatus installed in a vehicle, comprising the steps of:

capturing image information of an image taken of an area on a road traveled by the vehicle using an image pickup apparatus installed in the vehicle;

acquiring, from map information stored in a map information database, road feature information associated with features in the neighborhood of the imaged area; and recognizing the image information, using the road feature information to recognize, in the image information, images of recognition targets corresponding to the features associated with the acquired road feature information;

wherein the step of recognizing the image information comprises the steps of detecting in the image information, based on the road feature information, portions of the imaged area likely to include the image of a recognition target, and adjusting, based on the detection result, a recognition algorithm such that a criterion used to determine whether an image of interest is an image of the recognition target becomes lower for the portions of the imaged area likely to include the image of the recognition target than for the remainder of the imaged area.

21. The image recognition method according to claim 20, wherein the step of recognizing the image information comprises the steps of extracting one or more candidates for the image of the recognition target from the image information, comparing the extracted candidates with the road feature information, and employing a candidate having high similarity with the road feature information as the image of the recognition target, thereby recognizing the image of the recognition target.

22. The image recognition method according to claim 20 further comprising:

applying the recognition algorithm to detect edges on images included in the captured image information and to detect the number of edge points across the width of the road;

wherein the portions of the imaged area likely to include the image of a recognition target are detected based on the number of detected edges therein; and wherein the criterion is a threshold value for the number of detected edges.

23. An image recognition method, executed by a navigation apparatus installed in a vehicle, comprising the steps of:

capturing image information of an image taken of an area on a road traveled by the vehicle using an image pickup apparatus installed in the vehicle;

acquiring, from map information, road feature information associated with a first feature and a second feature in the neighborhood of the imaged area;

recognizing an image of a first recognition target corresponding to the first feature that can be relatively easily recognized and that is included in the image information;

comparing the image of the first recognition target recognized in the first target recognition step with the road feature information associated with the first feature acquired in the road feature information acquisition step to detect the correspondence between the image information and the road feature information;

based on the result of the comparison made in the road feature information comparison step, detecting from the image information portions of the imaged area likely to include an image of a second recognition target corresponding to the second feature that is more difficult to recognize than the first recognition target; and recognizing an image of the second recognition target included in the image information, by adjusting a recognition algorithm based on the result of the detection made in the likely area detection step such that a criterion, used to determine whether an image is of the second recognition target, becomes lower for the portions of the imaged area likely to include the image of the second recognition target than a criterion for the remainder of the imaged area.

24. The image recognition method according to claim 23, further comprising:

applying the recognition algorithm to detect edges on images included in the captured image information and to detect the number of edge points across the width of the road;

wherein the portions of the imaged area likely to include an image of the second recognition target area are detected based on the detected number of edges therein; and wherein the criterion is a threshold value for the number of detected edges.

* * * * *

UNITED STATES PATENT AND TRADEMARK OFFICE
CERTIFICATE OF CORRECTION

PATENT NO. : 7,668,341 B2
APPLICATION NO. : 11/338712
DATED : February 23, 2010
INVENTOR(S) : Miyajima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this

Twenty-eighth Day of December, 2010

David J. Kappos
*Director of the United States Patent and Trademark Office*